W. E. CALLANE.
JOURNAL BEARING.
APPLICATION FILED APR. 4, 1911.
1,036,519.
Patented Aug. 20, 1912.
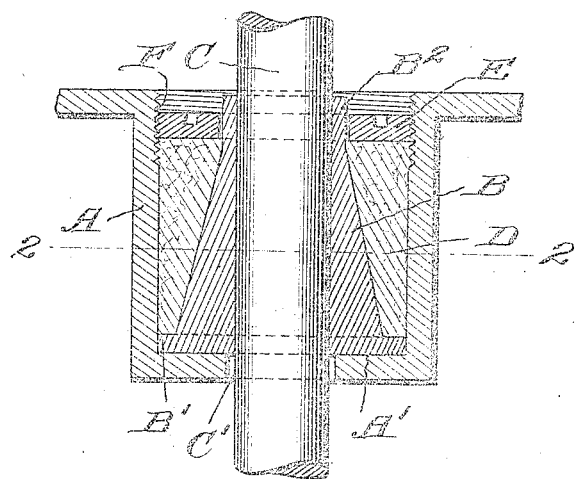
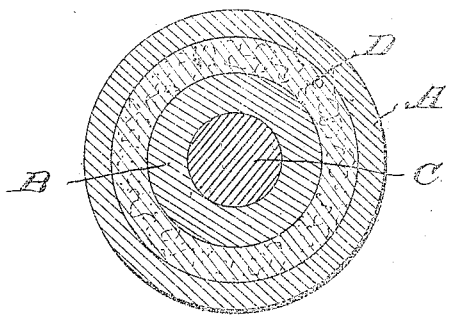
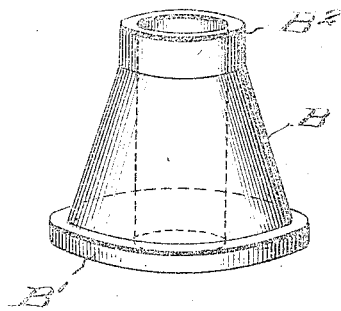
Witnesses
Geo. A. Byrne.
H. H. Byrne.
Inventor
W. E. Callane
by J. A. Mackin
Attorney

UNITED STATES PATENT OFFICE.

WALDO E. CALLANE, OF LEBANON, INDIANA.

JOURNAL-BEARING.

1,036,519.

Specification of Letters Patent.   Patented Aug. 20, 1912.

Application filed April 4, 1911.   Serial No. 618,813.

*To all whom it may concern:*

Be it known that I, WALDO E. CALLANE, a citizen of the United States of America, residing at Lebanon, in the county of Boone and State of Indiana, have invented certain new and useful Improvements in Journal-Bearings, of which the following is a specification.

The present invention relates to journal bearings and is designed with especial reference for high speed machines to the end that there may be the minimum amount of vibration to the shaft; and wherein the proper alinement and cushioning tension can be maintained without interfering with the transmission.

The invention further proposes an arrangement wherein the shaft bearing member through its own construction and manner of mounting will tend to set true with respect to the supported shaft.

The invention is shown by way of illustration in the accompanying drawings wherein—

Figure 1 is a vertical sectional view thereof. Fig. 2 is a transverse sectional view of Fig. 1 taken on the line 2—2, and; Fig. 3 is a detailed perspective view of the bearing block.

Referring to the structure in further detail and with like reference characters indicating corresponding parts in the different figures shown A designates a suitable casing or cup which may be separate or forming part of the machine casing proper. Mounted within the casing A is a bearing block of substantially conical structure, which is provided at its base with the annular portion or flange B′ the bottom surface of which is adapted to contact with the base A′ of the casing and thus provide a circumferential bearing for said block. On the opposite end the block has formed thereon and disposed axially thereof an integral collar $B^2$. At its base the bearing portion B′ is of substantially the same diameter as that of the casing A, thus centering the shaft C within said casing and which projects therethrough at the opening C′.

Surrounding the cone bearing B and between the base flange B′ and the inner edge of the collar $B^2$ is a packing D of any suitable material adapted to cushion the bearing block B in the casing A, and also to arrest side strain and prevent shock or vibration to the shaft C. Overlying the exposed face of the packing D is a collar or nut E screw threaded, as at F, within the casing A. Through the medium of the collar E the density of the packing D may be varied to fix the cone bearing B at its proper rigidity, and also to set the shaft C in correct alinement.

What is claimed as new is:

The combination with a shaft, of a bearing therefor comprising a cylindrical casing having an inwardly disposed annular base at one end and open at the other end thereof, said open end provided with internal screw threads; an apertured conical block located wholly within said casing, said block having its base in contact with said annular base and provided with an annular and radially projecting flange having its periphery disposed against the inner surface of said casing; said conical block having an integral and axially disposed collar at the apex thereof; a packing surrounding said block and confined between the inner edge of said collar and said base flange; and a collar apertured to receive the cone collar having screw threaded engagement with said casing and adapted to compress said packing, substantially as described.

In testimony whereof I affix my signature in presence of two witnesses.

WALDO E. CALLANE.

Witnesses:
 JOSEPH W. CUNNINGHAM,
 IVAN COULTER.